United States Patent Office 3,463,789
Patented Aug. 26, 1969

3,463,789
GLYCIDYL OXETYL ETHERS
John A. Wojtowicz, East Haven, Conn., and Joel A. Zaslowsky, Baltimore, Md., assignors to Olin Mathieson Chemical Corporation, a corporation of Virginia
No Drawing. Filed June 2, 1966, Ser. No. 554,688
Int. Cl. C07d 1/00, 3/00, 21/00
U.S. Cl. 260—333                              4 Claims

ABSTRACT OF THE DISCLOSURE

Allyloxyoxetanes are hypochlorinated by reaction with chlorine, bromine or iodine in the presence of water to yield halogenated oxetane compounds. In turn, the novel oxetane halohydrins are dehydrohalogenated in the presence of aqueous alkali metal hydroxide to give glycidyl oxetyl ethers which are useful as stabilizers for halogen-containing resins, such as vinyl chloride.

This invention relates to novel glycidyl oxetyl ethers and to a method for their preparation. More particularly, in the method of this invention, allyloxyoxetane compounds are first hypochlorinated to yield novel halogenated oxetanes, including oxetane halohydrins. In the second step of the novel method of this invention, the oxetane halohydrins are dehydrohalogenated to give glycidyl oxetyl ethers.

PREPARATION OF THE HALOGENATED OXETANE COMPONDS

In the first step of the method of this invention, a halogen selected from the group consisting of chlorine, bromine or iodine, is reacted at a temperature of from about —10° C. to +100° C. and in the presence of water with an allyloxyoxetane compound of the formula:

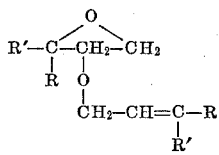

wherein R and R' are each selected from the group consisting of hydrogen and alkyl of from 1 to 5 inclusive carbon atoms. The novel halogenated oxetane compounds have the formula:

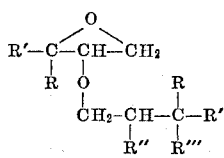

wherein R and R' are each selected from the group consisting of hydrogen and alkyl of from 1 to 5 inclusive carbon atoms, R" and R"' are each selected from the group consisting of hydroxyl and halogen selected from the group consisting of chlorine, bromine and iodine, and with the proviso that when one of R" and R"' is hydroxyl, the other is halogen. Although gaseous halogens can be conveniently employed, if desired, the halogen can be utilized as a liquid or, when iodine is employed, the solid form is satisfactory. The time of reaction will vary over a wide range and generally will be from about 0.2 hour to about 5 hours or more depending upon the other reaction conditions employed. The amount of chlorine employed can be varied widely and preferably will be about 1 mole per mole of the allyloxyoxetane compound charged to the reactor. Recovery of the halogenated oxetane compound from the reaction mixture can be accomplished by a variety of methods well known in the art, such as by distillation, extraction, etc. Either batch, intermittent, or continuous method of operation can be utilized.

Although the novel first stage operation of this invention can be carried out at atmospheric pressure, if desired, pressures varying from about 0.1 atmosphere up to 10 atmospheres or more can be utilized.

Usually the reaction is carried out in the presence of an acid acceptor, which can be calcium carbonate, sodium carbonate, sodium hydroxide, potassium hydroxide, sodium bicarbonate, lime, pyridine, etc. The quantity of acid acceptor employed can be varied widely and generally will be from the stoichiometric amount up to 150 percent or more of the stoichiometric requirement.

The starting allyloxyoxetane compounds can be obtained in the manner described in Polak et al. application, Ser. No. 399,852, filed Sept. 28, 1964. For example, 3-allyloxyoxetane, which has the formula:

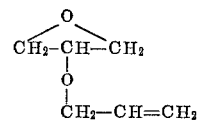

can be prepared by first reacting allyl alcohol with gaseous chlorine at a temperature below 50° C. to yield a reaction mixture containing 2-allyloxy-3-chloro-1-propanol which, in turn, is dehydrohalogenated in the presence of aqueous sodium hydroxide at a temperature below 110° C. to yield 3-allyloxyoxetane.

Oxetane compounds useful as starting materials include 3-allyloxyoxetane, 3(3'-methyl) allyloxyoxetane, 3(3'-methyl-3'-ethyl) allyloxyoxetane, 3(3'3'-diisopropyl) allyloxyoxetane, 3(3'3'-dibutyl) allyloxyoxetane, 3(3'-isobutyl-3'-amyl) allyloxyoxetane, 3(3'3'-diamyl) allyloxyoxetane, etc.

PREPARATION OF THE GLYCIDYL OXETYL ETHER COMPOUNDS

In the second stage of this novel reaction an oxetane halohydrin of the formula:

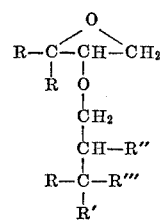

wherein R and R' are each selected from the group consisting of hydrogen and alkyl of from 1 to 5 carbon atoms, R" and R"' are each selected from the group consisting of hydroxyl and halogen selected from the group consisting of chlorine, bromine and iodine, and with the proviso that one of R" and R"' is hydroxyl and the other is halogen, is dehydrohalogenated in the presence of aqueous alkali metal hydroxide to yield a glycidyl oxetyl ether of the formula:

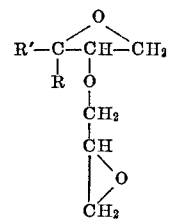

From about 1 to about 5 moles of the alkali metal hydroxide per mole of the halohydrin are generally employed in the dehydrohalogenation step. The strength of the alkali metal hydroxide solution utilized can be varied widely and generally will be from 5 to 50 percent by weight based on the total weight of the solution and, preferably, will be from about 20 to 45 percent by weight on the same basis. Sodium, potassium, and lithium hydroxides can be utilized in the second stage of the reaction. The temperature at which the dehydrogenation step is conducted usually will be from about 0° to about 150° C. and preferably will be from about 10° to about 60° C. The time of the reaction will vary from about 2 to 25 hours or more depending upon the reaction conditions employed. Pressures varying from subatmospheric to +10 atmospheres or more can be employed in this novel dehydrohalogenation reaction. Continuous, batch or intermittent method of operation can be employed. Advantageously, the reaction is carried out in an inert organic solvent which can be, for example, ethylene dichloride, propylene dichloride, methyl ethyl ketone, diethyl ketone, diethyl ether butanol or benzene. The glycidyl oxetyl ether product can be recovered in a variety of ways well known in the art. For example, at the conclusion of the reaction water can be added to dissolve the alkali metal halide formed and the products extracted from the aqueous layer by means of treatment with portions of ethylene dichloride, propylene dichloride, methyl ethyl ketone, diethyl ketone, benzene, butanol, diethyl ether, etc. after which the aqueous layer extract can be combined with the original organic layer and the final recovery of the product achieved by distillation. In another recovery method, the product is extracted directly from the crude reaction mixture with a material such as ethylene dichloride, propylene dichloride, methyl ethyl ketone, butanol, diethyl ether or benzene and then recovered from the organic extract by means of distillation.

The glycidyl oxetyl ethers of this invention are particularly useful as stabilizers for halogen-containing resins in which the halogen is attached directly to the carbon atoms such as vinyl halogen resins, and particularly vinyl chloride resin and vinylidine resin. From about 1 to about 20 percent of the glycidyl oxetyl ether compound, based on the total weight of the composition, can be added to the resin for purposes of stabilization. The glycidyl oxetyl ether can be incorporated in the resin by admixing in an appropriate mill or mixer or by any other of the well known methods which provide for uniform distribution throughout the resin composition. Thus, mixing can be accomplished by milling on rolls at 100–160° C. On aging and at higher temperatures resins of this type (i.e., polyvinyl chloride, etc.) breakdown to yield hydrogen chloride and it has been found that the novel glycidyl ocetyl ethers of this invention are extremely useful in combining with the hydrogen chloride released and in inhibiting the further decomposition of such materials.

The following example illustrates various embodiments of this invention and are to be considered not limitative:

Example I 3-allyloxyoxetane (45.6, 0.40 mole), water (800 g.) and calcium carbonate (40 g., 0.40 mole) were charged to a one-liter reactor equipped with stirrer, thermometer, platinum and calomel electrode, and a chlorine sparger. The reaction was cooled with ice. Chlorine was introduced into the well stirred solution at about 6.5 mmols (i.e., millimoles) per minute. The end point of the reaction was determined potentiometrically (27.5 g., 0.395 mole Cl₂). The reaction mixture was filtered, the filtrate saturated with salt and when extracted three times with 300 cc. portions of methyl ethyl ketone following which the methyl ethyl ketone was stripped-off at atmospheric pressure (pot temperature 160° C., head temperature 79° C.) through a 12 inch column packed with ⅛″ glass helices. Further, vacuum distillation gave a main fraction (50 g.), B.P. 93 to 99.5° C., 0.6 mm. Hg (fraction 1); a second fraction (6 g.), B.P. 108–112° C. (0.6 mm. Hg) (fraction 2); and a residue of 6 g. (fraction 3). Chromatographic analysis showed the main fraction to consist of 57.9 percent 3(3′-chloro-2′-hydroxypropoxy) oxetane (A), 33.1 percent 3(3′-hydroxy-2′-chloropropoxy) oxetane (B) and 7.3 percent 3(2′,3′-dichloropropoxy oxetane (C). About 80 percent by weight of the second fraction was found to consist of a mixture of 3(3′-chloro-2-hydroxypropoxy) oxetane, 3(3′-hydroxy-2-chloropropoxy) oxetane and 7.3 percent of 3(2′,3′-chloro)propoxy oxetane while about 30 percent by weight of the residue consisted of a mixture of the same three products found in the first two fractions.

Compounds A, B, and C can be recovered in pure form by distillation through an efficient column under vacuum conditions, for example, through an 18″ spinning band type distillation unit.

21.2 g. of fraction 1 (see above) was dissolved in 50 cc. propylene dichloride following which the solution was cooled to 0° and stirred magnetically. A total of 10 cc. of 35 percent aqueous sodium hydroxide was added dropwise over a ten minute period and stirring was continued for an additional four hour period. After sufficient water had been added to dissolve the sodium chloride, the mixture separated into two layers. The aqueous layer was extracted twice with 25 cc. portions of propylene dichloride and the extract added to the initial organic layer. The combined organic layer (130 cc.) contained 103 mmoles of glycidyl oxetyl ether as shown by epoxide analysis. The solvent was removed under atmospheric pressure using a 6″ column packed with glass helices. Further distillation under vacuum yielded 13.7 g. of glycidyl oxetyl ether at 58°/0.75 mm. Hg.

*Analysis.*—Calc'd for $C_6H_{10}O_3$: C, 55.37; H, 7.74. Found: C, 55.09; H, 7.64.

Example II

Allyloxyoxetane 0.345 mole 760 g. water and 33 g. calcium carbonate were placed in a one-liter hypochlorination apparatus employed in Example I. The reaction mixture was maintained at about 15 to 20° C. while chlorine was introduced to the well-stirred solution at about 6.5 mmoles per minute. The reaction was complete in 52 minutes (26 g. of chlorine added). The residual calcium carbonate was filtered off and washed with water after which the filtrate was saturated with sodium chloride and extracted three times with 300 cc. portions of methyl ethyl ketone. The total volume of the methyl ethyl ketone extract was 1000 cc. A total of 900 cc. of the methyl ethyl ketone extract was placed in a two liter, three-neck flask equipped with stirrer, thermometer, and addition funnel. Aqueous sodium hydroxide (28.5 cc. of 35 percent) was added to the well-stirred solution over a half hour period following which the reaction mixture was stirred for 8.5 hours at a temperature of 20 to 40° C. The resulting reaction mixture, which consisted of two layers was separated in a separatory funnel. In the next step, the aqueous layer was extracted with 50 cc. of methyl ethyl ketone and the combined organic layer was then placed in a one-liter distillation flask equipped with a 12″ Vigreux column. Methyl ethyl ketone water azeotrope and methyl ethyl ketone were stripped off at atmospheric pressure (max. pot temp. 135° C.). The contents of the flask was transferred to a 100 cc. distillation flask and the Vigreux column was replaced with an 8″ packed column following which the residual solvent was removed by evaporation under vacuum. The product, glycidyl oxetyl ether of the formula:

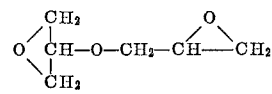

was distilled from the flask at 55° (.6 mm. Hg pressure). A total of 32.2 g. of product was obtained. (Yield: 80 percent of theoretical based on the starting 3-allyloxyoxetane, $d_4^{20}$ 1.136, $n_D^{20}$ 1.45). The pot residue, which weighed 6.0 g., consisted of 3(2′3′-dichloro) propoxy oxetane together with some 3(3'-hydroxy-2'-chloropropoxy) oxetane.

Molecular weight of the glycidyl oxetyl ether by freezing point depression was 127 (calculated 130).

*Analysis.*—Calc'd for $C_6H_{10}O_3$: C, 55.37; H, 7.74. Found: C, 55.9; H, 7.64.

The structure was verified by infrared and nuclear magnetic resonance.

What is claimed is:

1. A compound of the formula:

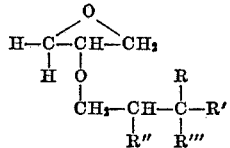

wherein R and R' are each selected from the group consisting of hydrogen and alkyl of from 1 to 5 inclusive carbon atoms, R" and R''' are each selected from the group consisting of hydroxyl and halogen selected from the group consisting of chlorine, bromine, and iodine, and with the proviso that one of R" and R''' is hydroxyl and the other is halogen.

2. The compound of claim 1 wherein R and R' are each hydrogen, R" is hydroxyl and R''' is chlorine.

3. The compound of claim 1 wherein R and R' are each hydrogen, R" is chlorine and R''' is hydroxyl.

4. The oxetane of the formula:

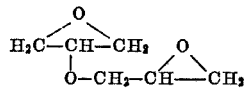

References Cited
UNITED STATES PATENTS

| | | | |
|---|---|---|---|
| 2,280,792 | 4/1942 | Bruson | 260—348 X |
| 2,599,817 | 6/1952 | Evans et al. | 260—348 X |
| 3,356,630 | 12/1967 | Vona et al. | 260—30.4 |
| 2,103,849 | 12/1937 | Heard | 260—348.6 |
| 2,582,114 | 1/1952 | Frisch | 260—348.6 |
| 3,261,874 | 7/1966 | Stogryn et al. | 260—348.6 |

NORMA S. MILESTONE, Primary Examiner

U.S. Cl. X.R.

260—30.4, 45.8, 348, 348.6